US011027704B2

(12) United States Patent
Lee et al.

(10) Patent No.: US 11,027,704 B2
(45) Date of Patent: Jun. 8, 2021

(54) WIPER BLADE ASSEMBLY

(71) Applicants: CAP Corporation, Sangju-si (KR); ITW Global Brands, a division of Illinois Tool Works Inc., Glenview, IL (US)

(72) Inventors: Sang Cheol Lee, Sangju-si (KR); Young Hun Lim, Sangju-si (KR); Subramaniam Shanmugham, Sugar Land, TX (US); Martin Rosas, Cypress, TX (US)

(73) Assignees: CAP CORPORATION, Sangju-si (KR); ILLINOIS TOOL WORKS INC., Glenview, IL (US)

( * ) Notice: Subject to any disclaimer, the term of this patent is extended or adjusted under 35 U.S.C. 154(b) by 270 days.

(21) Appl. No.: 15/933,813

(22) Filed: Mar. 23, 2018

(65) Prior Publication Data

US 2019/0135234 A1 May 9, 2019

(30) Foreign Application Priority Data

Nov. 9, 2017 (KR) .......................... 10-2017-0148812

(51) Int. Cl.
*B60S 1/38* (2006.01)
(52) U.S. Cl.
CPC ............. *B60S 1/3863* (2013.01); *B60S 1/381* (2013.01); *B60S 1/387* (2013.01); *B60S 1/3853* (2013.01);
(Continued)
(58) Field of Classification Search
CPC .... B60S 1/3849; B60S 1/3853; B60S 1/3806; B60S 1/381; B60S 1/3863; B60S 1/3858;
(Continued)

(56) References Cited

U.S. PATENT DOCUMENTS 8,701,241 B2 4/2014 Kim et al.
9,434,353 B2 9/2016 An et al.
(Continued)

FOREIGN PATENT DOCUMENTS

CN 106515669 A 3/2017
DE 10043427 * 3/2002
(Continued)

OTHER PUBLICATIONS

Machine translation of description portion of German publication 10043427, published Mar. 2002. (Year: 2002).*
(Continued)

*Primary Examiner* — Gary K. Graham
(74) *Attorney, Agent, or Firm* — Myers Wolin, LLC

(57) ABSTRACT

Disclosed herein is a wiper blade assembly including: a contact member; an elastic member for supporting the contact member; a cover member for covering the elastic member; and a coupling cover to be fastened to the elastic member. The cover member includes: a spoiler; an extended plate extended from one end of the spoiler; a first coupling protrusion located in a first predetermined position of the extended plate; and a first coupling hole located in a second predetermined position of the extended plate adjacent to the first coupling protrusion. The coupling cover includes: a second coupling hole located in an inner space thereunder and receiving the first coupling protrusion of the cover member; and a second coupling protrusion located adjacent to the second coupling hole and inserted into the first coupling hole of the cover member. The cover member can be reliably fixed to the wiper blade assembly.

8 Claims, 14 Drawing Sheets

(52) U.S. Cl.
CPC ..... *B60S 1/3858* (2013.01); *B60S 2001/3843* (2013.01)

(58) Field of Classification Search
CPC . B60S 1/3881; B60S 2001/3843; B60S 1/387
USPC .......................... 15/250.32, 250.43, 250.201
See application file for complete search history.

(56) References Cited

U.S. PATENT DOCUMENTS

| | | | |
|---|---|---|---|
| 2006/0207050 A1* | 9/2006 | Shanmugham | B60S 1/3858 15/250.43 |
| 2008/0222831 A1 | 9/2008 | Thienard | |
| 2013/0227811 A1* | 9/2013 | Kim | B60S 1/3848 15/250.201 |
| 2014/0359963 A1* | 12/2014 | An | B60S 1/3858 15/250.201 |
| 2015/0059116 A1* | 3/2015 | An | B60S 1/3858 15/250.201 |

FOREIGN PATENT DOCUMENTS

| | | | |
|---|---|---|---|
| DE | 102011077519 | * | 12/2012 |
| KR | 2008/0049045 A | | 6/2008 |
| KR | 20110112794 A | | 10/2011 |
| KR | 101130039 B1 | | 3/2012 |
| KR | 101484062 B1 | | 1/2015 |

OTHER PUBLICATIONS

Office Action for corresponding Korean Application No. KR10-2017-0148812 dated Jan. 14, 2019.

* cited by examiner

[FIG. 1A]
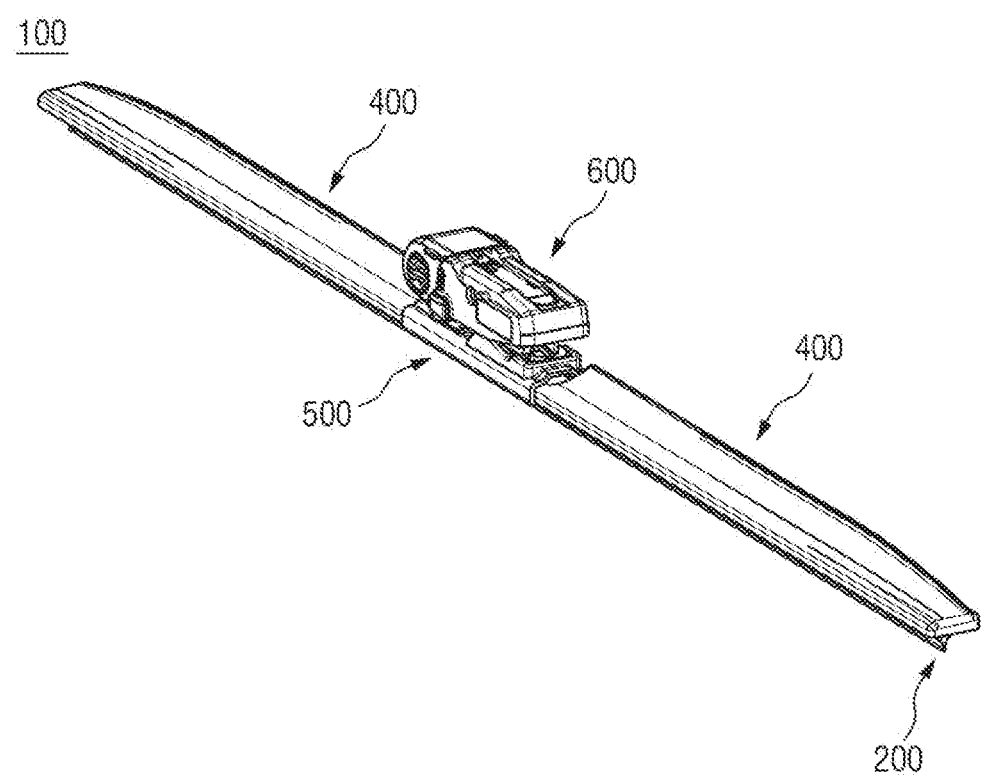

[FIG. 1B]
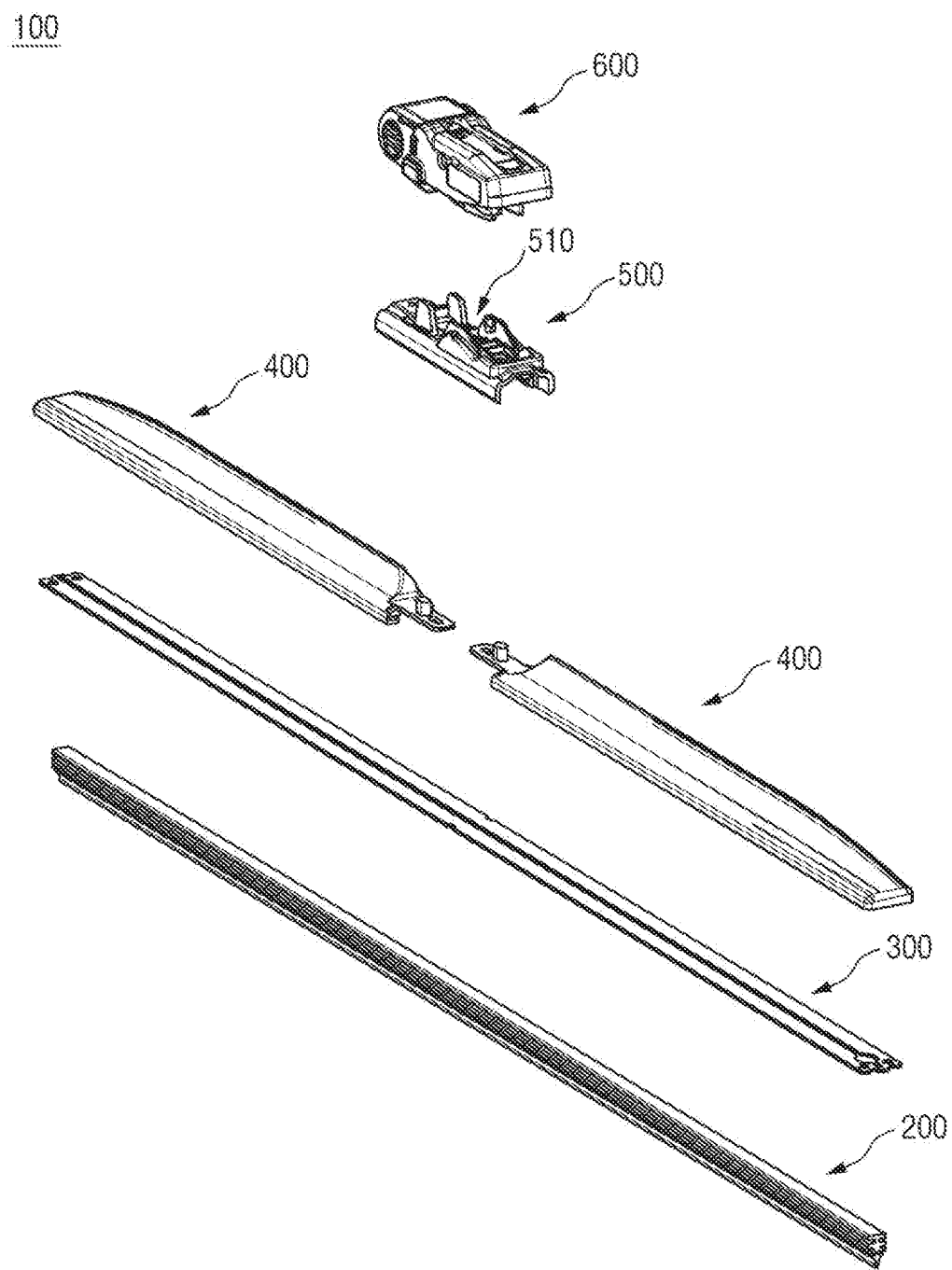

[FIG. 2A]
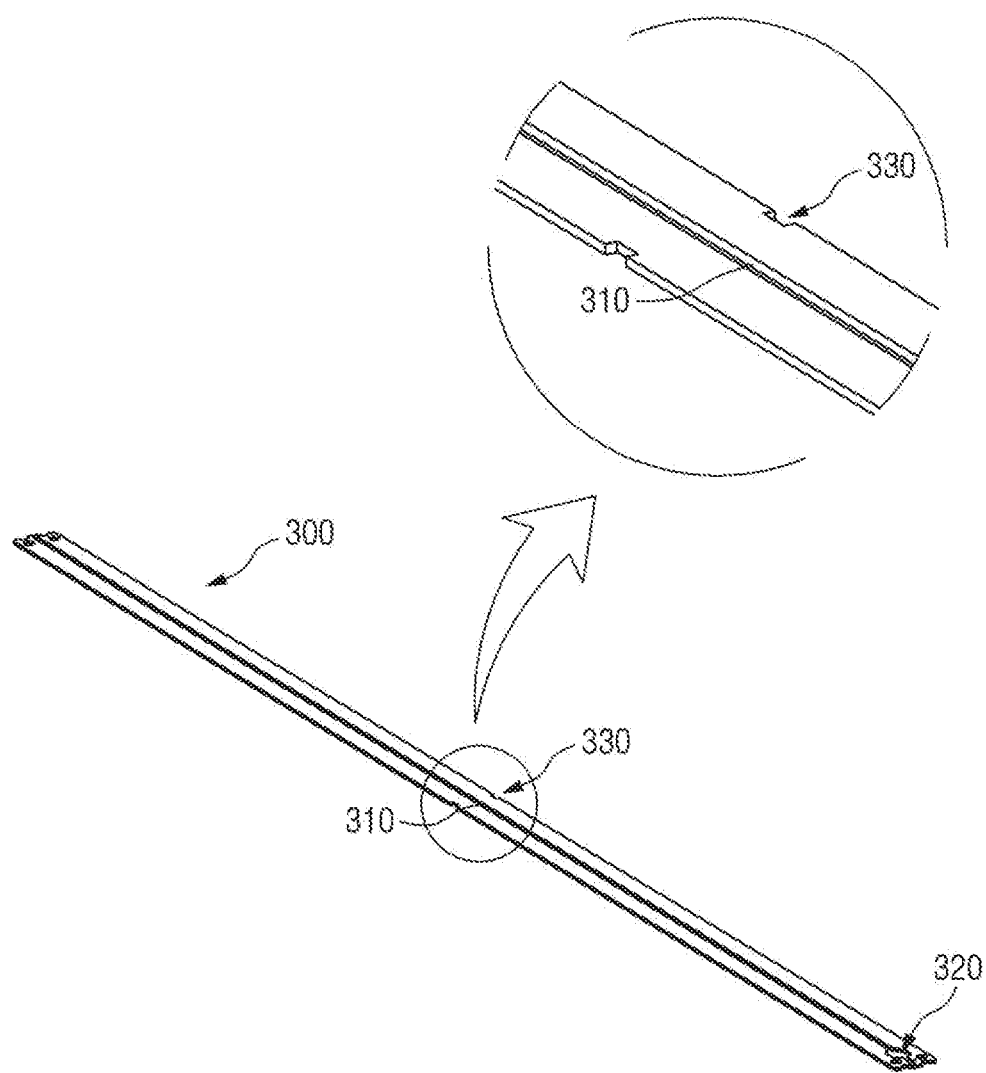

[FIG. 2B]
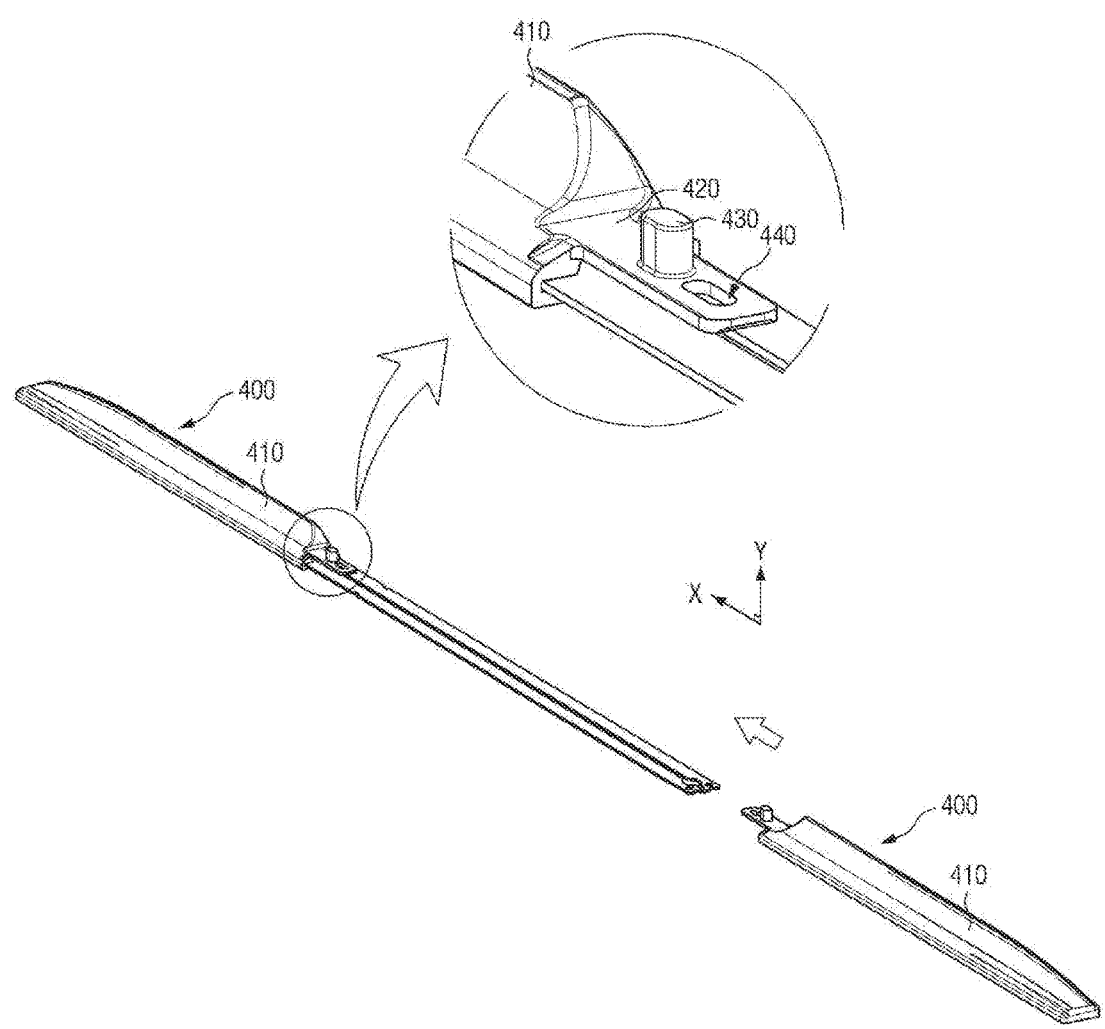

[FIG. 2C]
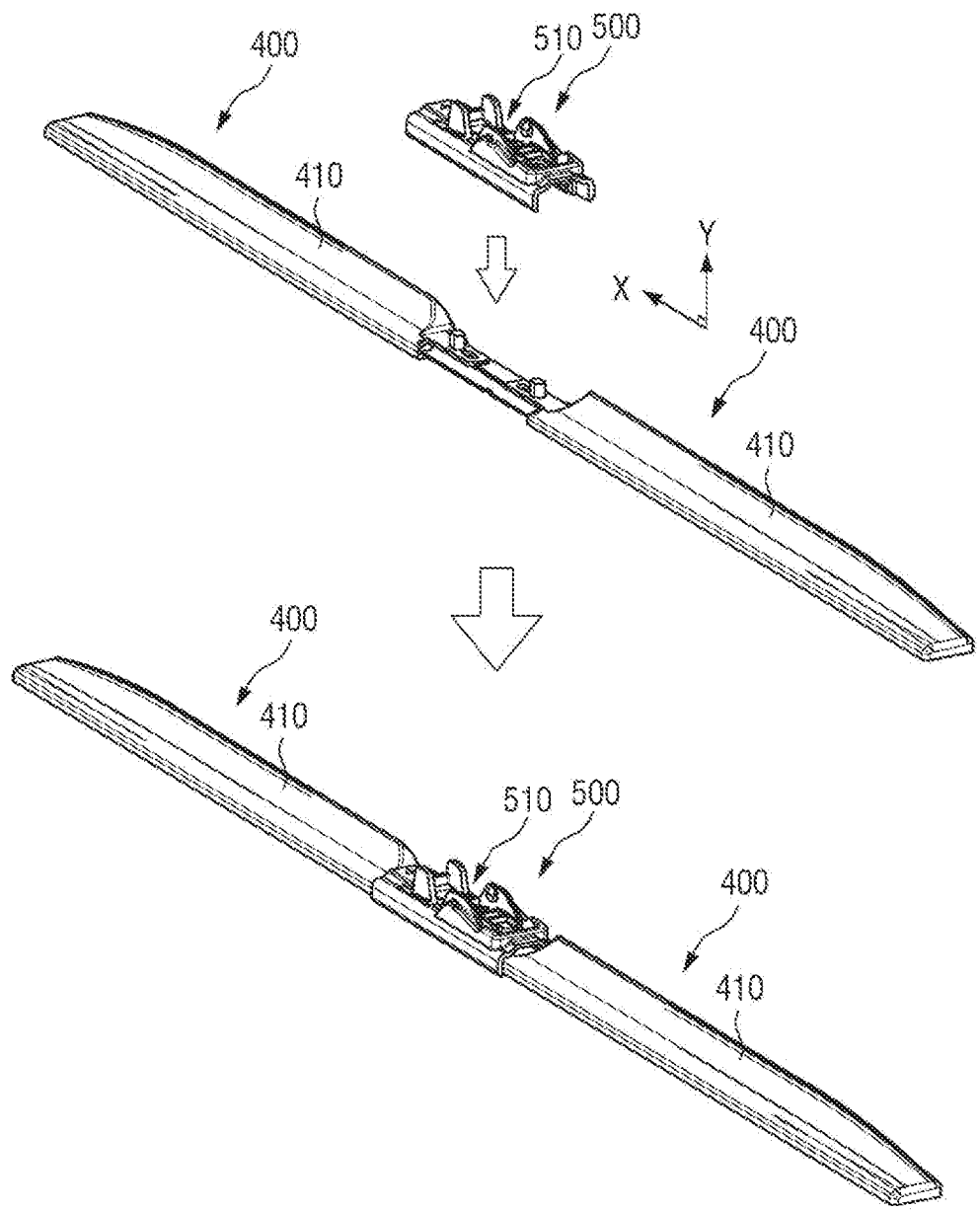

[FIG. 2D]
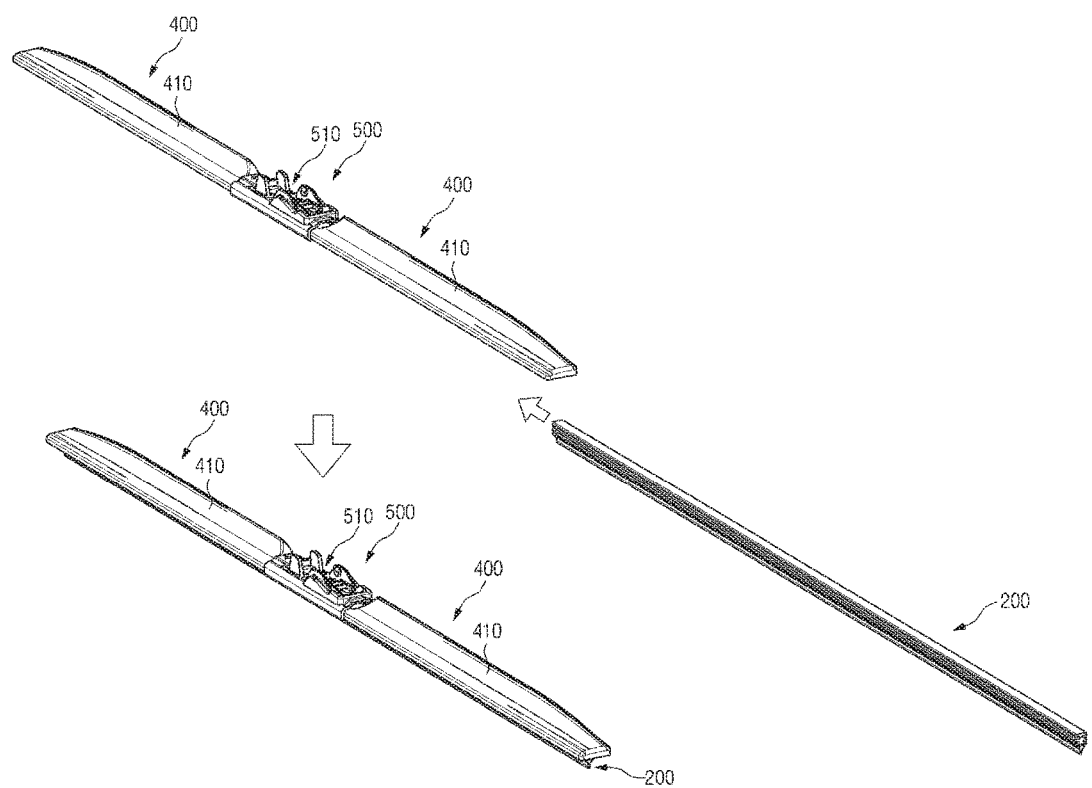

[FIG. 3A]
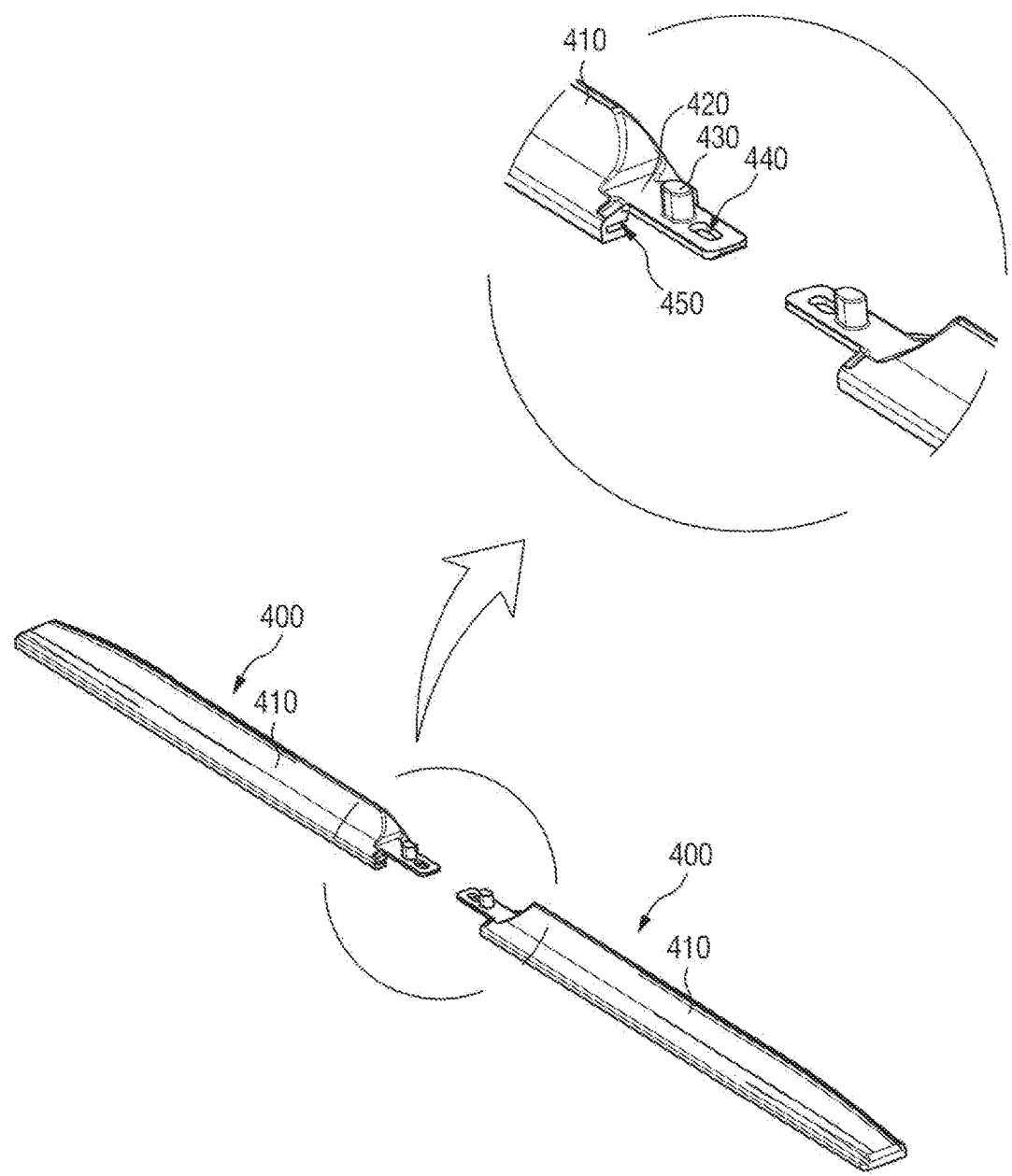

[FIG. 3B]
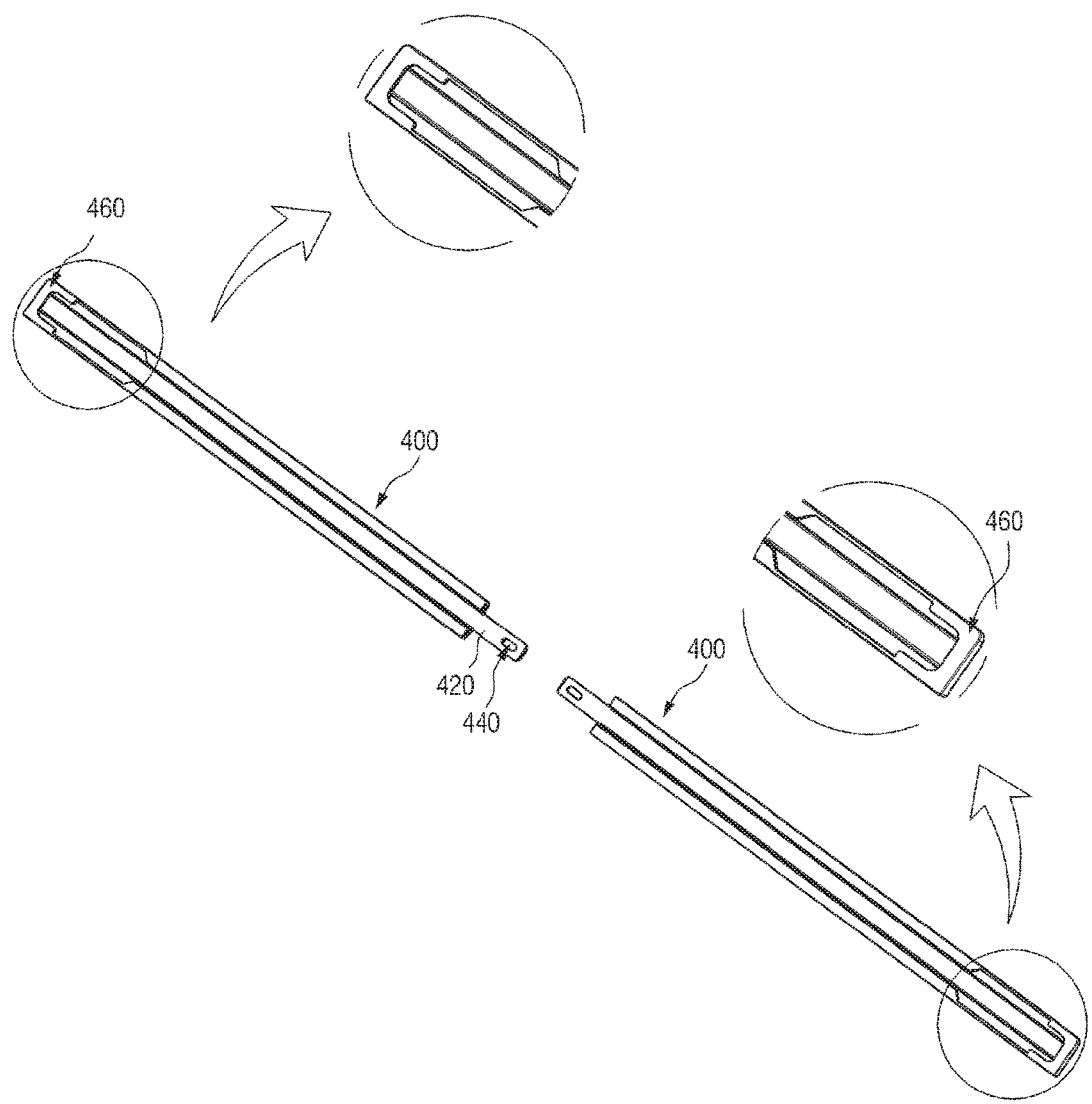

[FIG. 4A]
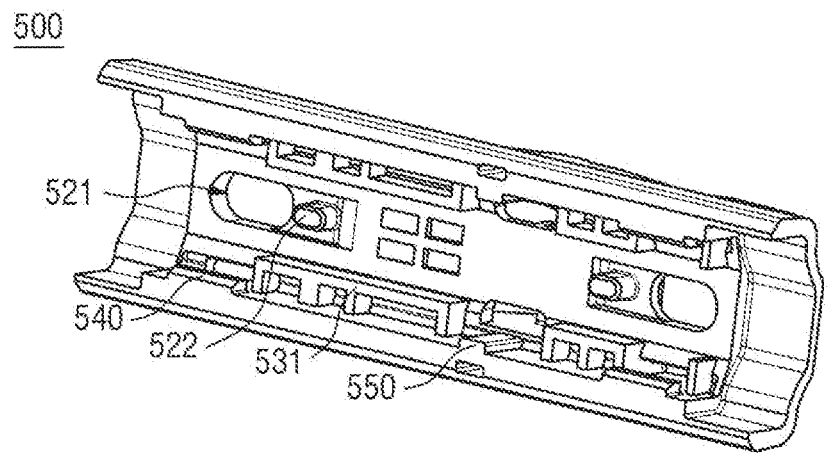
[FIG. 4B]
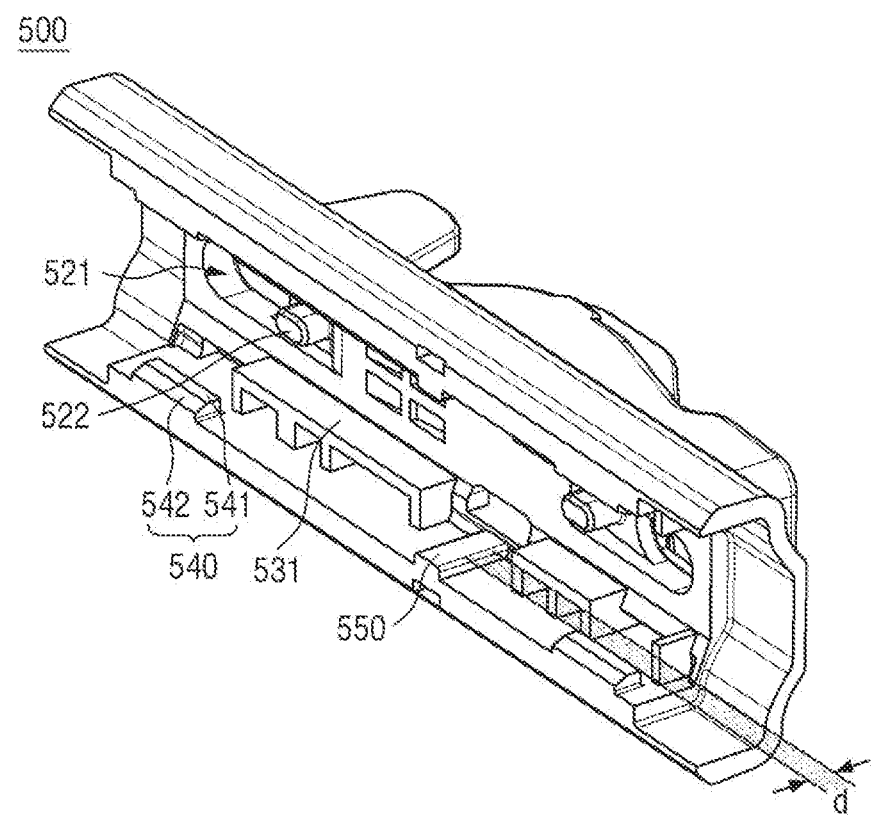

[FIG. 4C]
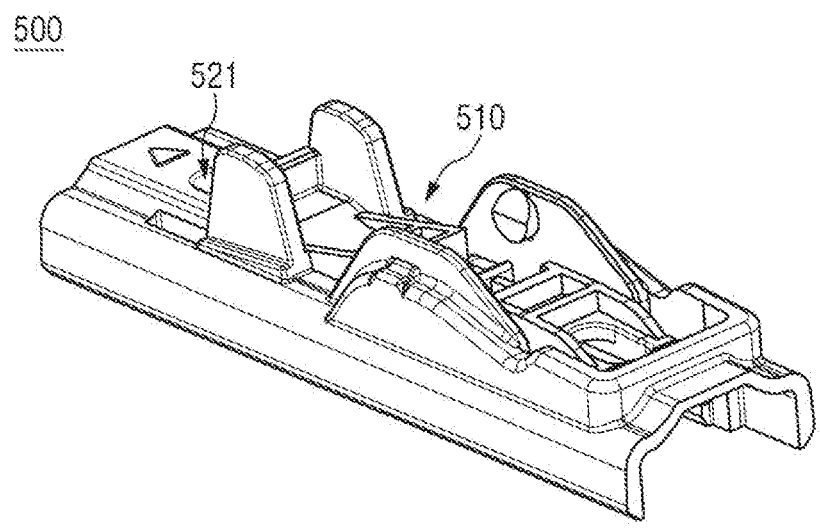
[FIG. 4D]
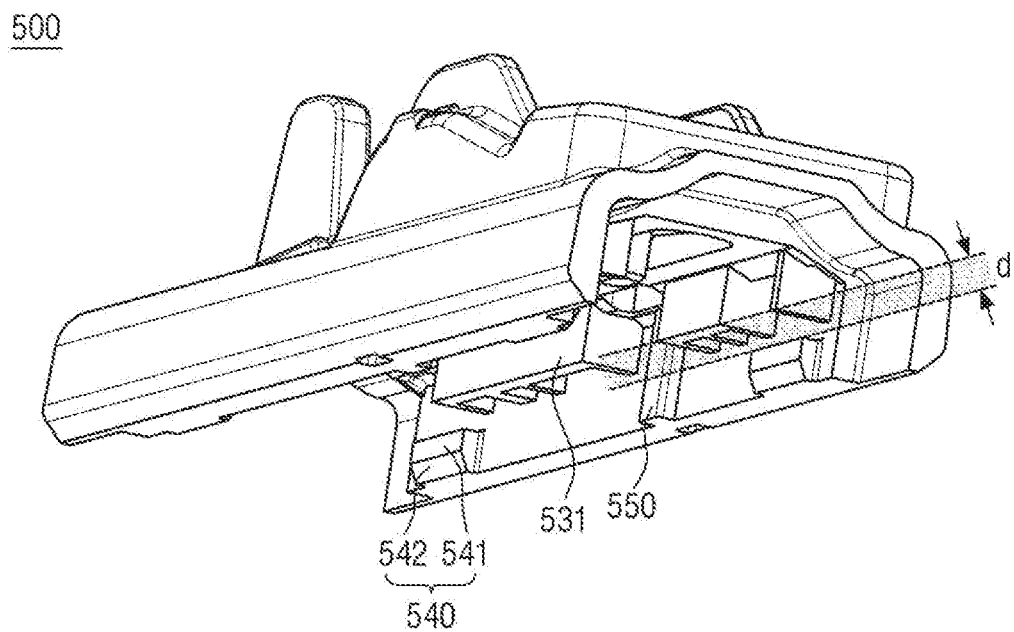

[FIG. 5A]
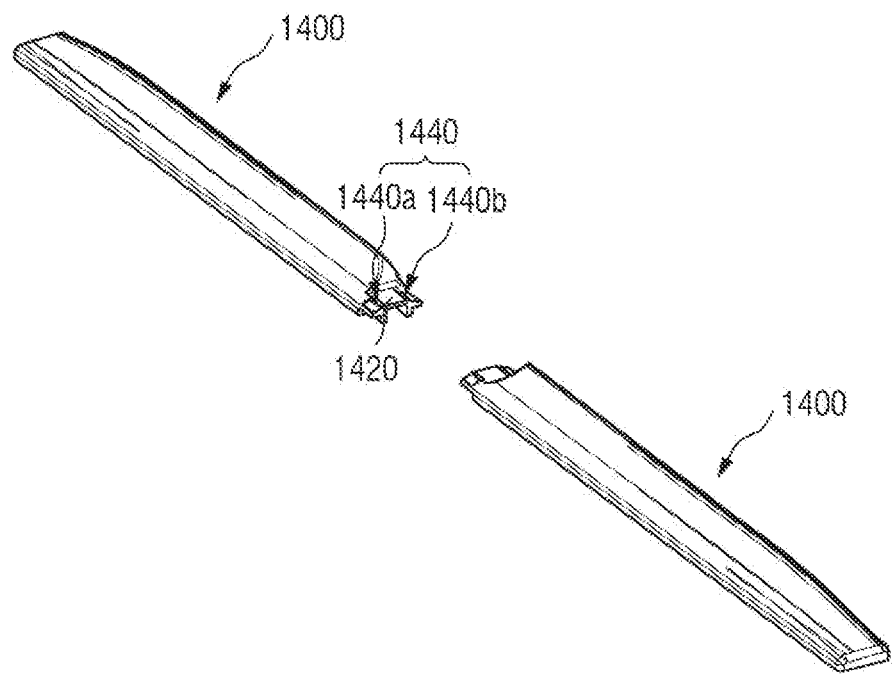
[FIG. 5B]
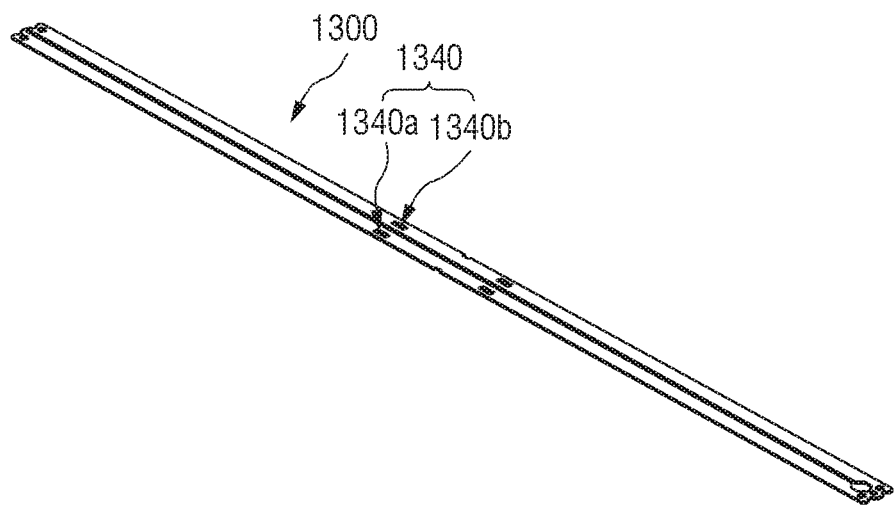

[FIG. 5C]
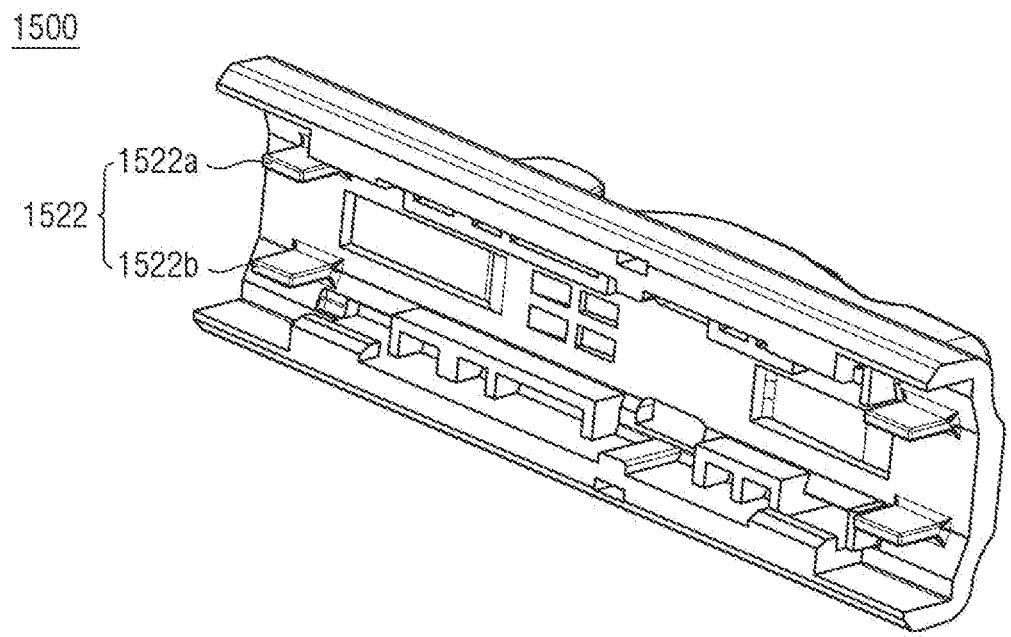
[FIG. 6A]
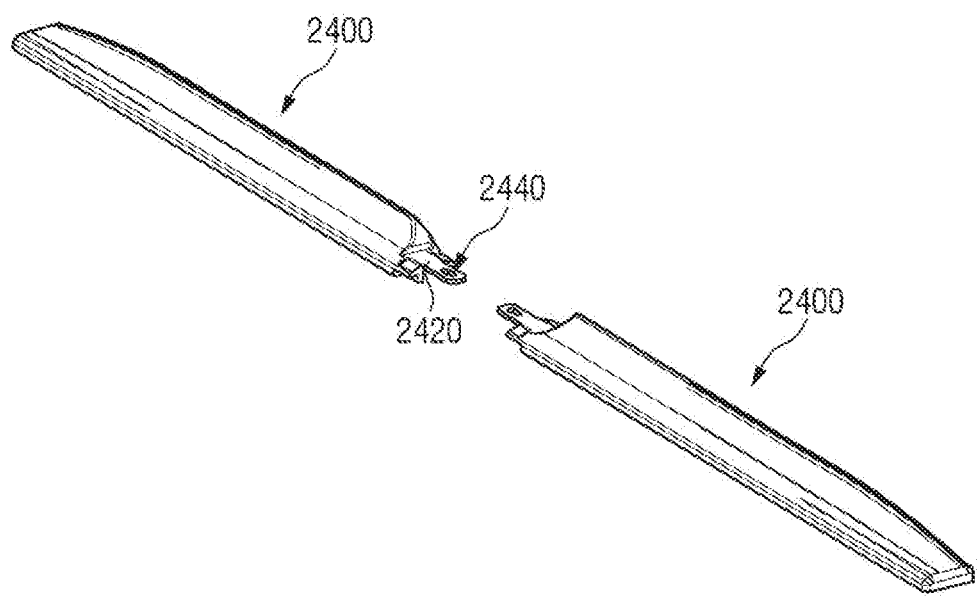

[FIG. 6B]
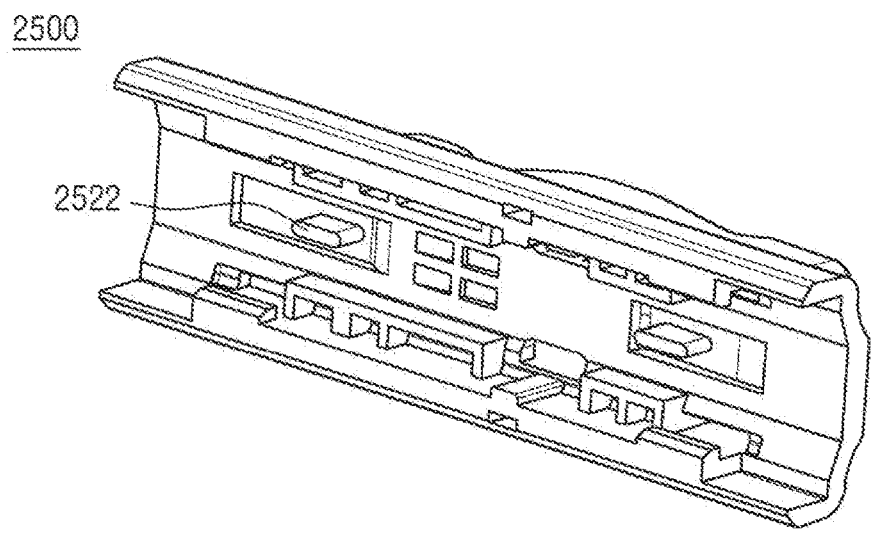
[FIG. 7A]
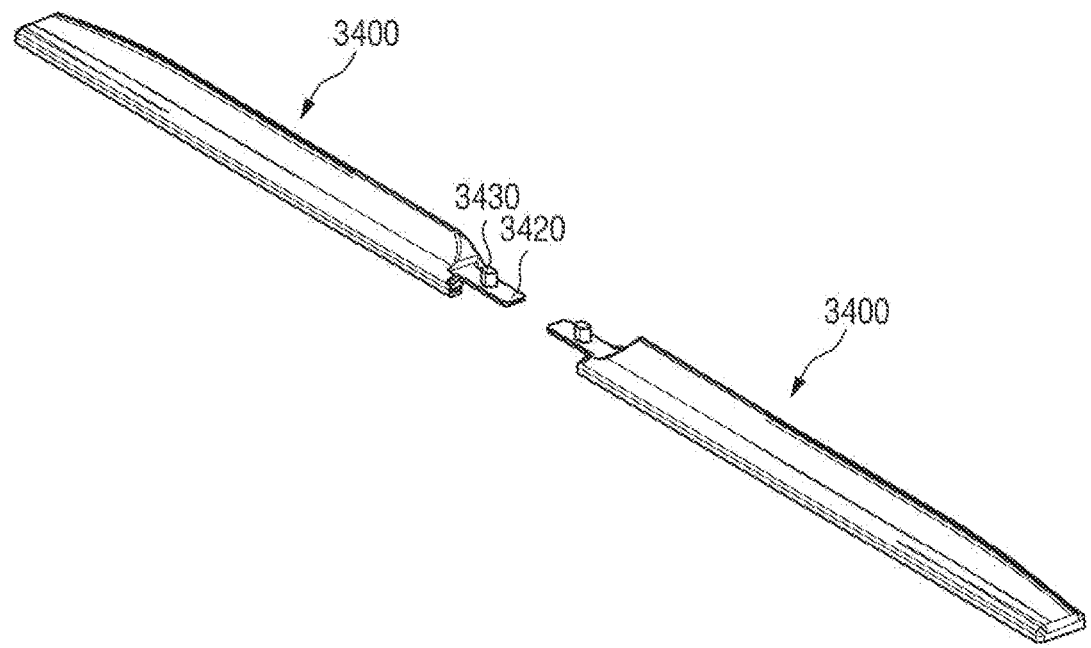

[FIG. 7B]
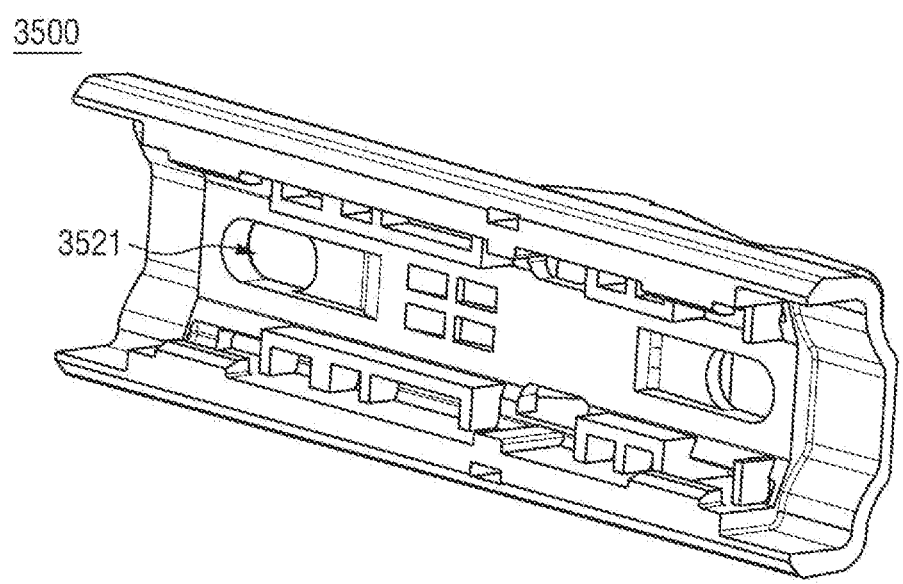

WIPER BLADE ASSEMBLY

This application claims priority from Korean Patent Application No. 10-2017-0148812 filed on Nov. 9, 2017 in the Korean Intellectual Property Office, the disclosure of which is incorporated herein by reference in its entirety.

BACKGROUND

1. Field of the Disclosure

The present disclosure relates to a wiper blade assembly, and more particularly, to a wiper blade assembly to which a spoiler can be reliably fixed.

2. Description of the Related Art

In order to wipe the surface of the windshield of a vehicle, a wiper device is installed. The wiper device includes a wiper motor, a wiper arm, and a wiper blade assembly.

The base end of the wiper arm is connected to the rotary shaft of the wiper motor such that it reciprocates by the wiper motor. The wiper blade assembly is detachably coupled to the distal end of the wiper arm and wipes the surface of the windshield while sliding the surface of the windshield as the wiper arm reciprocates.

Such a wiper blade assembly is placed on the windshield of a vehicle. While the vehicle is traveling, the wiper blade is subjected to force by the wind or air flow that strikes the windshield over its longitudinal direction. Such force causes the wiper blade to float from the surface of the windshield. Particularly, as the vehicle travels at a higher speed, the floating force becomes stronger, which weakens the contact between the wiper strip and the surface of the windshield. As a result, the wiping performance deteriorates.

In order to cope with the deterioration of the wiping performance due to the floating of the wiper blade assembly, a spoiler is mounted on the wiper blade assembly. The spoiler has a profile that creates a counterforce toward the surface of the windshield in reaction with the air flow.

Typically, the spoiler is coupled with an elastic member supporting the wiper strip by being fitted into it. However, there is a problem in that the spoiler is separated from the elastic member as the wiper blade assembly is operated.

SUMMARY

Aspects of the present disclosure provide a wiper blade assembly to which a spoiler can be reliably fixed.

It should be noted that objects of the present disclosure are not limited to the above-described objects, and other objects of the present disclosure will be apparent to those skilled in the art from the following descriptions.

According to an aspect of the present disclosure, there is provided a wiper blade assembly including: a contact member; an elastic member for supporting the contact member; a cover member for covering the elastic member; and a coupling cover to be fastened to the elastic member. The cover member includes: a spoiler; an extended plate extended from one end of the spoiler; a first coupling protrusion located in a first predetermined position of the extended plate; and a first coupling hole located in a second predetermined position of the extended plate adjacent to the first coupling protrusion. The coupling cover includes: a second coupling hole located in an inner space thereunder and receiving the first coupling protrusion of the cover member; and a second coupling protrusion located adjacent to the second coupling hole and inserted into the first coupling hole of the cover member.

According to another aspect of the present disclosure, there is provided a wiper blade assembly comprising: a contact member; an elastic member for supporting the contact member; a cover member for covering the elastic member; and a coupling cover to be fastened to the elastic member, wherein the cover member comprises: a spoiler; an extended plate extended from one end of the spoiler; and a third coupling hole located in a predetermined position of the extended plate, wherein the elastic member comprises a through-hole at a position corresponding to the third coupling hole, and wherein the coupling cover comprises a third coupling protrusion located in an inner space thereunder and inserted into the third coupling hole of the cover member.

According to yet another aspect of the present disclosure, there is provided a wiper blade assembly comprising: a contact member; an elastic member for supporting the contact member; a cover member for covering the elastic member; and a coupling cover to be fastened to the elastic member, wherein the cover member comprises: a spoiler; an extended plate extended from one end of the spoiler; and a fourth coupling hole or a fourth coupling protrusion located at a predetermined position of the extended plate, wherein the coupling cover comprises a fifth coupling protrusion inserted into the fourth coupling hole of the cover member, or a fifth coupling hole receiving the fourth coupling protrusion of the cover member, located in an inner space under the coupling cover.

The cover member is not separated from the elastic member while the cover member is fastened to the coupling cover.

The movement of the cover member in a longitudinal direction of the elastic member is restricted while the cover member is fastened to the coupling cover.

The coupling cover may be fastened to the cover member in a height direction of the cover member.

The cover member may include a plug to close another end of the cover member.

The elastic member may include: a coupling hole for coupling with the contact member; a contact member insertion hole located at one end of the coupling hole; and a fixing groove formed at a center portion of the elastic member in a longitudinal direction thereof and in a side surface of the elastic member in a thickness direction thereof.

The coupling cover may include a receiving portion at its top, and an adapter may be attached to/detached from the receiving portion.

The coupling cover may include a fixing protrusion extended from a bottom of the coupling cover toward an inner area of the coupling cover in a height direction thereof, wherein the fixing protrusion is inserted into the fixing groove of the elastic member.

The coupling cover may include a first supporting portion located at a predetermined position in an inner side surface of the coupling cover, and a second supporting portion spaced apart from the first supporting portion by a predetermined distance d, the elastic member may be inserted into a space between the first supporting portion and the second supporting portion having a width of the predetermined distance d, and the first supporting portion may support a first face of the elastic member, while the second supporting portion may support a second face of the elastic member.

The first supporting portion may include a step and a tapered surface extended from the step, and the side surface of the elastic member in the thickness direction may move along the tapered surface so that the first face of the elastic member is supported by the step.

According to an exemplary embodiment of the present disclosure, a cover member can be reliably fixed to a wiper blade assembly.

BRIEF DESCRIPTION OF THE DRAWINGS

The above and other aspects and features of the present disclosure will become more apparent by describing in detail exemplary embodiments thereof with reference to the attached drawings, in which:

FIG. 1A is a perspective view of a wiper blade assembly according to an exemplary embodiment of the present disclosure;

FIG. 1B is an exploded perspective view of the wiper blade assembly according to the exemplary embodiment of the present disclosure;

FIGS. 2A to 2D are perspective views for illustrating an assembling procedure of the wiper blade assembly according to the exemplary embodiment of the present disclosure;

FIGS. 3A and 3B are perspective views showing a cover member according to the exemplary embodiment of the present disclosure;

FIGS. 4A to 4D are perspective views of the coupling cover according to the exemplary embodiment of the present disclosure;

FIGS. 5A to 5C are perspective views for illustrating a first modification of the elastic member, the cover member and the coupling cover according to the exemplary embodiment of the present disclosure;

FIGS. 6A and 6B are perspective views for illustrating a second modification of the cover member and the coupling cover according to the exemplary embodiment of the present disclosure; and FIGS. 7A and 7B are perspective views for illustrating a third modification of the cover member and the coupling cover according to the exemplary embodiment of the present disclosure.

DETAILED DESCRIPTION OF THE EMBODIMENTS

Advantages and features of the present disclosure and methods to achieve them will become apparent from the descriptions of exemplary embodiments hereinbelow with reference to the accompanying drawings. However, the present disclosure is not limited to exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims.

Hereinafter, exemplary embodiments of the present disclosure will be described in detail with reference to the accompanying drawings. In the drawings, like numerals refer to the same or similar elements or functionality throughout the several views. The term "and/or" used herein includes any and all combinations of one or more of the associated listed items.

Although terms such as first, second, etc. are used to distinguish arbitrarily between the elements such terms describe, and thus these terms are not necessarily intended to indicate temporal or other prioritization of such elements. Theses terms are used to merely distinguish one element from another. Accordingly, as used herein, a first element may be a second element within the technical scope of the present disclosure.

Terms used herein are for illustrating the embodiments rather than limiting the present disclosure. Unless specifically mentioned otherwise, a singular form includes a plural form in the present specification. Throughout this specification, the word "comprise" and variations such as "comprises" or "comprising," will be understood to imply the inclusion of stated elements but not the exclusion of any other elements.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Spatially relative terms, such as "below," "beneath," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the term "below" can encompass both orientations of above and below. The device may be otherwise oriented and the spatially relative descriptors used herein interpreted accordingly.

Hereinafter, exemplary embodiments of the present disclosure will be described in detail with reference to the accompanying drawings.

FIG. 1A is a perspective view of a wiper blade assembly according to an exemplary embodiment of the present disclosure. FIG. 1B is an exploded perspective view of the wiper blade assembly according to the exemplary embodiment of the present disclosure.

Referring to FIGS. 1A and 1B, the wiper blade assembly 100 according to the exemplary embodiment of the present disclosure includes a rubber contact member 200 in contact with a windshield of a vehicle, an elastic member 300 supporting the contact member, and a pair of cover members 400 covering the cover member 400.

In addition, the wiper blade assembly 100 includes a coupling cover 500 which is located in a certain position of the wiper blade assembly in the longitudinal direction to be coupled to the elastic member 300 and includes a receiving portion 510, and an adapter 600 attached to/detached from the receiving portion 510 of the coupling cover 500.

The coupling cover 500 may be located in the central region of the wiper blade assembly in the longitudinal direction. It is, however, to be understood that the position of the coupling cover 500 is not particularly limited herein.

The adapter 600 may be variously modified. The adapter 600 may be eliminated in some implementations.

Hereinafter, the wiper blade assembly 100 according to the exemplary embodiment of the present disclosure will be described in more detail.

FIGS. 2A to 2D are perspective views for illustrating an assembling procedure of the wiper blade assembly according to the exemplary embodiment of the present disclosure.

Initially, FIG. 2A is a perspective view of the elastic member 300 of the wiper blade assembly according to the exemplary embodiment of the present disclosure. The elastic member 300 includes a coupling hole 310 for coupling with the contact member 200, and a contact member insertion hole 320 located at one end of the coupling hole 310.

That is, one end of the contact member 200 is inserted through the contact member insertion hole 320, such that the contact member 200 is placed in the coupling hole 310 in the longitudinal direction.

The elastic member 300 includes a fixing groove 330 that is located in the center portion of the elastic member 300 in the longitudinal direction and formed in a side surface of the elastic member 300 in the thickness direction.

The fixing groove 330 is fastened to a fixing protrusion 550 of the coupling cover 500 to be described later, thereby restricting the movement of the elastic member in the longitudinal direction.

FIG. 2B is a perspective view of the elastic member 300 fastened to the cover member 400. As shown in FIG. 2B, according to the exemplary embodiment of the present disclosure, the pair of cover members 400 are inserted from the ends of the elastic member in the longitudinal directions X and −X of the elastic member, respectively, such that the pair of cover members 400 cover the elastic member 300.

FIGS. 3A and 3B are perspective views showing a cover member according to the exemplary embodiment of the present disclosure. In the following description, one of the pair of cover members, i.e., the cover member on the left side shown in FIG. 3A will be described. The cover member on the right side shown in FIG. 3A may be identical to the one on the left side.

Referring to FIGS. 3A and 3B, the cover member 400 according to the exemplary embodiment of the present disclosure includes a spoiler 410; an extended plate 420 extended from one end of the spoiler 410; a first coupling protrusion 430 located in a first predetermined position of the extended plate 420; and a first coupling hole 440 located in a second predetermined position of the extended plate 420 adjacent to the first coupling protrusion 430.

In addition, the cover member 400 includes an elastic member insertion portion 450 extended in the longitudinal direction of the spoiler 410.

That is, as described above with reference to FIG. 2B, the pair of cover members 400 are inserted from the ends of the elastic member, respectively, so that the pair of cover members 400 cover the elastic member 300. The side surfaces of the elastic member 300 in the thickness direction are fastened to the elastic member insertion portion 450 so that the elastic member 300 can be fastened to the cover member 400.

As shown in FIG. 3B, the cover member 400 includes a plug 460 that closes the other end of the cover member 400. Since the other end of the cover member 400 is closed, the elastic member does not come off the other end of the cover member. Therefore, the position at which the elastic member is inserted may be determined by the plug 460.

Subsequently, FIG. 2C is a perspective view of a process of fastening the coupling cover 500 to the cover member 400 fastened to the elastic member 300.

As shown in FIG. 2C, according to the exemplary embodiment of the present disclosure, the coupling cover 500 is fastened to the cover member 400 in a height direction (−Y) of the cover member 400.

Specifically, the pair of cover members 400 are inserted from the ends of the elastic member in the longitudinal directions X and −X of the elastic member, respectively, and then the coupling cover 500 is fastened to the cover member 400 in the height direction −Y of the cover member 400.

FIGS. 4A to 4D are perspective views of the coupling cover according to the exemplary embodiment of the present disclosure.

Referring to FIGS. 4A to 4D, the coupling cover 500 includes a receiving portion 510 located at its top. As described above, the adapter 600 may be attached to and detached from the receiving portion 510.

The coupling cover 500 includes a second coupling hole 521 formed in the inner space under the coupling cover 500 and receives the first coupling protrusion 430 of the cover member 400; and a second coupling protrusion 522 located adjacent to the second coupling hole 521 and inserted into the first coupling hole 440 of the cover member 400.

That is, as described above with reference to FIG. 2C, according to the exemplary embodiment of the present disclosure, the coupling cover 500 is fastened to the cover member 400 in the height direction (−Y) of the cover member 400. In doing so, the first coupling protrusion 430 of the cover member 400 is inserted into the second coupling hole 521 of the coupling cover 500, and the second coupling protrusion 522 of the coupling cover 500 is inserted into the first coupling hole 440 of the cover member 400, so that the coupling cover 500 can be fastened to the cover member 400.

Accordingly, according to the exemplary embodiment of the present disclosure, while the cover member 400 is fastened to the coupling cover 500, the movement of the cover member 400 in the longitudinal direction X or −X of the elastic member can be restricted.

That is, according to the exemplary embodiment of the present disclosure, the first coupling protrusion 430 of the cover member 400 is inserted into the second coupling hole 521 of the coupling cover 500, and the second coupling protrusion 522 of the coupling cover 500 is inserted into the first coupling hole 440 of the cover member 400, so that it is possible to prevent the cover member 400 from being separated from the elastic member 300.

In addition, according to the exemplary embodiment of the present disclosure, since the coupling cover 500 is fastened to the cover member 400 in the height direction (−Y) of the cover member 400, the coupling cover 500 can be fastened to the cover member 400 regardless of the heights of the first coupling protrusion 420 and the second coupling protrusion 522.

As described above, the spoiler is typically coupled with an elastic member supporting the wiper strip by being fitted into it. However, there is a problem in that the spoiler is separated from the elastic member as the wiper blade assembly is operated.

In view of the above, according to the exemplary embodiment of the present disclosure, the first coupling protrusion 430 of the cover member 400 is inserted into the second coupling hole 521 of the coupling cover 500, and the second coupling protrusion 522 of the coupling cover 500 is inserted into the first coupling hole 440 of the cover member 400, so that the cover member 400 is not separated from the elastic member 300 while the cover member 400 is fastened to the coupling cover 500. As a result, the cover member 400 can be reliably fixed to the wiper blade assembly.

Referring to FIGS. 4A to 4D, the coupling cover 500 according to the exemplary embodiment of the present disclosure includes a first supporting portion 540 located at a predetermined position on the inner side surface of the coupling cover 500, and a second supporting portion 531 spaced apart from the first support portion 540 by a predetermined distance d.

The first supporting portion may be located at the bottom of the coupling cover, and the second supporting portion may be located in the inner area in the height direction of the coupling cover while maintaining a predetermined distance from the first supporting portion.

That is, the first supporting portion 540 and the second supporting portion 531 are spaced apart from each other by the predetermined distance d, thereby providing a space into which the elastic member 300 can be inserted. In addition, the first supporting portion 540 and the second supporting portion 531 support the elastic member 300 inserted into the space of the predetermined distance d.

That is, the first supporting portion supports a first surface of the elastic member, while the second supporting portion supports a second surface of the elastic member.

As described above, the coupling cover 500 is fastened to the cover member 400 in the height direction (−Y) of the cover member 400, where the elastic member 300 is already fastened to the cover member 400 as described above.

That is, the elastic member 300 is fastened to the cover member 400, and then the coupling cover 500 is fastened to the cover member 400 in the height direction (−Y) of the cover member 400 such that the elastic member 300 is inserted into the space between first and second supporting portions 540 and 531 spaced a by the distance of d.

In order to easily insert the elastic member 300 in the space having the width of the distance d, according to the exemplary embodiment of the present disclosure, the first supporting portion 540 has a step 541 and a tapered surface 542 extended from the step 541. the side surface of the elastic member 300 in the thickness direction moves along the tapered surface 542, such that a first face of the elastic member 300 is supported by the step 541 while a second face of the elastic member 300 is supported by the second supporting portion.

Referring to FIGS. 4A to 4D, the coupling cover 500 according to the exemplary embodiment of the present disclosure includes a fixing portion 550 that is located at a predetermined position of the coupling cover 500 and extended from the bottom of the coupling cover toward the inner area of the coupling cover 500 in the height direction.

The fixing protrusion 550 restricts the movement of the elastic member 300 in the longitudinal direction. As described above, the fixing protrusion 550 is located in the center portion of the elastic member 300 in the longitudinal direction, and is inserted into the fixing groove 330 formed in the side surface of the elastic member 300 in the thickness direction, thereby restricting the movement of the elastic member in the longitudinal direction.

FIG. 2D shows a process of fastening the contact member 200 to the elastic member 300 inserted into the cover member 400 while the coupling cover 500 is fastened to the cover member 400.

As described above, the elastic member 300 includes the coupling hole 310 for coupling with the contact member 200 and the contact member insertion hole 320 located at one end of the coupling hole 310. Accordingly, by inserting one end of the contact member 200 through the contact member insertion hole 320 and to keep moving the contact member in the longitudinal direction of the elastic member, the contact member 200 can be coupled in the longitudinal direction.

Hereinafter, another example of fastening the cover member to the coupling cover according to an exemplary embodiment of the present disclosure will be described.

FIGS. 5A to 5C are perspective views for illustrating a first modification of the elastic member, the cover member and the coupling cover according to the exemplary embodiment of the present disclosure. The elastic member, the cover member and the coupling cover of the first modification are identical to the elastic member of FIG. 2A, the cover member of FIGS. 3A and 3B, the cover of FIGS. 4A to 4D, respectively, except for the descriptions given below.

Initially, referring to FIG. 5A, the cover member 1400 of the first modification includes an extended plate 1420 extended from one end of the spoiler, and a third coupling hole unit 1440 located at a predetermined position of the extended plate 1420.

The third coupling hole unit 1440 includes a left third coupling hole 1440a and a right third coupling hole 1440b spaced apart from the left third coupling hole 1440a by a predetermined distance.

Subsequently, referring to FIG. 5B, the elastic member 1300 of the first modification includes a through-hole unit 1340 located in a position corresponding to the third coupling hole unit 1440.

More specifically, the through-hole unit 1340 includes a first through-hole 1340a located in a position corresponding to the left third coupling hole 1440a, and a second through-hole 1340b located in a position corresponding to the right third coupling hole 1440b.

Subsequently, referring to FIG. 5C, the coupling cover 1500 of the first modification includes a third coupling protrusion unit 1522 located in the inner space under the coupling cover 1550 and inserted into the third coupling hole unit 1440 of the cover member 1440.

More specifically, the third coupling protrusion unit 1522 includes an upper coupling protrusion 1522a inserted into the left third coupling hole 1440a, and a lower coupling protrusion 1522b inserted into the right third coupling hole 1440b.

According to the exemplary embodiment of the present disclosure, the upper third coupling protrusion 1522a is inserted into the left third coupling hole 1440a and also into the first through-hole 1340a of the elastic member 1300. Likewise, the lower third coupling protrusion 1522b is inserted into the right third coupling hole 1440b and also into the second through-hole 1340b of the elastic member 1300.

Accordingly, according to the exemplary embodiment of the present disclosure, while the cover member 1400 is fastened to the coupling cover 1500, the movement of the cover member 1400 in the longitudinal direction X or −X of the elastic member can be reliably restricted.

FIGS. 6A and 6B are perspective views for illustrating a second modification of the cover member and the coupling cover according to the exemplary embodiment of the present disclosure. The cover member and the coupling cover of the second modification are identical to the cover member of FIGS. 3A and 3B, the coupling cover of FIGS. 4A to 4D, respectively, except for the descriptions given below.

Initially, referring to FIG. 6A, the cover member 2400 of the second modification includes an extended plate 2420 extended from one end of the spoiler, and a fourth coupling hole 2440 located at a predetermined position of the extended plate 2420.

Subsequently, referring to FIG. 6B, the coupling cover 2500 of the second modification includes a fourth coupling protrusion 2522 located in the inner space under the coupling cover 2500 and inserted into the fourth coupling hole 2440 of the cover member 2400.

Accordingly, according to the exemplary embodiment of the present disclosure, while the cover member 2400 is fastened to the coupling cover 2500, the movement of the cover member 2400 in the longitudinal direction X or −X of the elastic member can be restricted.

FIGS. 7A and 7B are perspective views for illustrating a third modification of the cover member and the coupling cover according to the exemplary embodiment of the present disclosure. The cover member and the coupling cover of the third modification are identical to the cover member of FIGS. 3A and 3B, the coupling cover of FIGS. 4A to 4D, respectively, except for the descriptions given below.

Initially, referring to FIG. 7A, the cover member 3400 of the third modification includes an extended plate 3420 extended from one end of the spoiler, and a fifth coupling protrusion 3430 located at a predetermined position of the extended plate 3420.

Subsequently, referring to FIG. 7B, the coupling cover 3500 of the third modification includes a fifth coupling hole 3521 located in the inner space under the coupling cover 3500 and inserted into the fifth coupling protrusion 3430 of the cover member 3400.

Accordingly, according to the exemplary embodiment of the present disclosure, while the cover member 3400 is fastened to the coupling cover 3500, the movement of the cover member 2400 in the longitudinal direction X or −X of the elastic member can be restricted.

As described above, according to the exemplary embodiments of the present disclosure, the coupling cover includes the coupling protrusion and the coupling hole while the cover member includes the coupling hole to receive the coupling protrusion of the coupling cover and the coupling protrusion to be inserted into the coupling hole of the coupling cover; or the coupling cover includes the coupling protrusion while the cover member includes the coupling hole to receive the coupling protrusion of the coupling cover; or the coupling cover includes the coupling hole while the cover member includes the coupling protrusion to be inserted into the coupling hole. Thus, the movement of the cover member in the longitudinal direction (X or −X) of the elastic member can be restricted while the cover member is fastened to the coupling cover.

Although the exemplary embodiments of the present disclosure have been described with reference to the accompanying drawings, those skilled in the art will appreciate that various modifications and alterations may be made without departing from the spirit or essential features of the present disclosure. Therefore, it should be understood that the above-mentioned embodiments are not limiting but illustrative in all aspects.

What is claimed is:

1. A wiper blade assembly comprising:
a contact member;
an elastic member for supporting the contact member;
an elongated coupling cover to be fastened to the elastic in a height direction of the coupling cover; and
an elongated cover member for covering the elastic member and configured to receive the coupling cover therein in a height direction of the cover member;
wherein the cover member comprises: a spoiler; an extended plate extended from one end of the spoiler; a first coupling protrusion located in a first predetermined position of the extended plate; and a first coupling through-hole located in a second predetermined position of the extended plate adjacent to the first coupling protrusion,
wherein the coupling cover comprises: a second coupling through-hole located in an inner space thereunder; and a second coupling protrusion located adjacent to the second coupling through-hole,
wherein the second coupling through-hole receives the first coupling protrusion of the cover member and the second coupling protrusion is inserted into the first coupling through-hole of the cover member while the coupling cover is fastened to the cover member in the height direction of the cover member, such that the cover member is immovably fixed to the coupling cover in opposing longitudinal directions of the cover member, and
wherein the height direction is perpendicular to the longitudinal direction of the cover member.

2. The wiper blade assembly of claim 1, wherein movement of the cover member in a longitudinal direction of the elastic member is restricted while the cover member is fastened to the coupling cover.

3. The wiper blade assembly of claim 1, wherein the cover member comprises a plug to close another end of the cover member.

4. The wiper blade assembly of claim 1, wherein the elastic member comprises: a coupling hole for coupling with the contact member; a contact member insertion hole located at one end of the coupling hole; and a fixing groove formed at a center portion of the elastic member in a longitudinal direction thereof and in a side surface of the elastic member in a thickness direction thereof.

5. The wiper blade assembly of claim 4, wherein the coupling cover comprises a fixing protrusion extended from a bottom of the coupling cover toward an inner area of the coupling cover in a height direction thereof, and
wherein the fixing protrusion is inserted into the fixing groove of the elastic member.

6. The wiper blade assembly of claim 4, wherein the coupling cover comprises a first supporting portion located at a predetermined position in an inner side surface of the coupling cover, and a second supporting portion spaced apart from the first supporting portion by a predetermined distance d,
wherein the elastic member is inserted into a space between the first supporting portion and the second supporting portion having a width of the predetermined distance d, and
wherein the first supporting portion supports a first face of the elastic member, while the second supporting portion supports a second face of the elastic member.

7. The wiper blade assembly of claim 6, wherein the first supporting portion comprises a step and a tapered surface extended from the step, and
wherein the side surface of the elastic member in the thickness direction moves along the tapered during assembly so that the first face of the elastic member is supported by the step.

8. The wiper blade assembly of claim 1, wherein the coupling cover comprises a receiving portion at it's top, wherein an adapter can be attached to and detached from the receiving portion.

* * * * *